United States Patent [19]
Berman et al.

[11] 3,738,380
[45] June 12, 1973

[54] PRESSURE CONTROL VALVE

[75] Inventors: George A. Berman, Detroit; Graydon J. Choinski, Utica, both of Mich.

[73] Assignee: TRW Inc., Cleveland, Ohio

[22] Filed: Oct. 23, 1970

[21] Appl. No.: 83,494

Related U.S. Application Data

[62] Division of Ser. No. 878,665, Nov. 21, 1969, Pat. No. 3,597,010.

[52] U.S. Cl. .............................. 137/115, 137/625.3
[51] Int. Cl. ........................................... F16k 17/10
[58] Field of Search ................... 137/115, 505.18, 137/625.3; 303/10, 21 F

[56] References Cited
UNITED STATES PATENTS

| 1,285,769 | 11/1918 | Melcher | 137/625.3 |
|---|---|---|---|
| 817,153 | 4/1906 | Barr | 137/625.3 |
| 2,918,087 | 12/1959 | Curran | 137/625.3 |
| 3,307,568 | 3/1967 | Gartner | 137/115 |
| 2,420,394 | 5/1947 | Gilman | 137/115 |

Primary Examiner—Harold W. Weakley
Attorney—Carlton Hill, Benjamin H. Sherman, Charles F. Meroni et al.

[57] ABSTRACT

A pressure-compensating valve wherein a cylindrical bar stock piece is machined to provide a center flow pintle cooperable with an annular scanning annulus, thereby to provide a stepped and partially infinitely variable valve which permits partial or full diameter area sections to freely be sensed in a balanced state relieving any tendency for the pressure-compensating valve to bind or otherwise develop hydraulic imbalance.

6 Claims, 17 Drawing Figures

PATENTED JUN 12 1973 3,738,380

INVENTORS
GEORGE A. BERMAN
GRAYDON J. CHOINSKI

BY Hill Sherman Meroni Gross & Simpson
ATTORNEYS

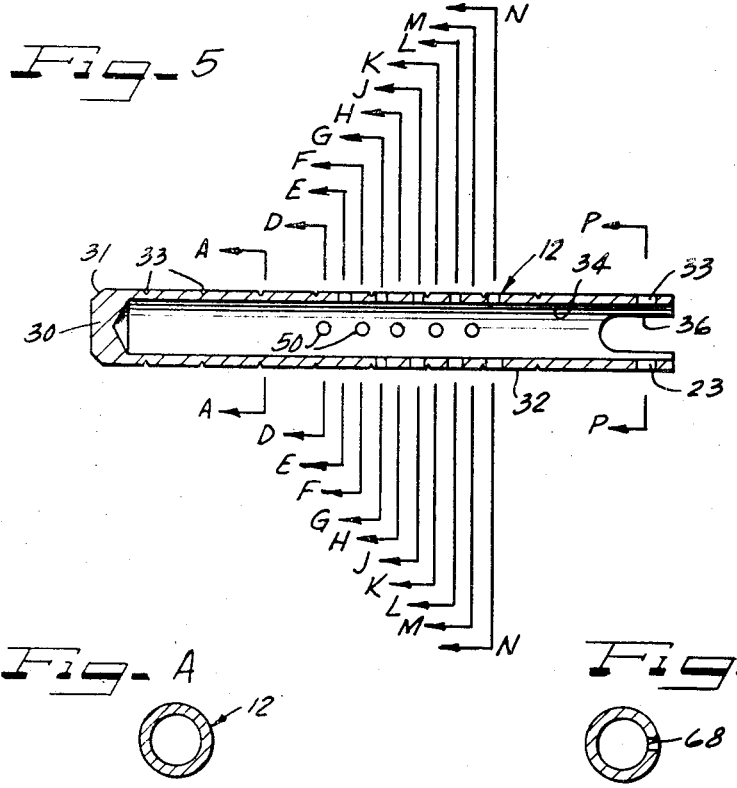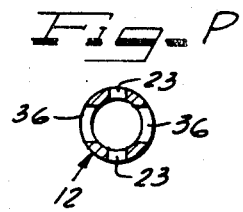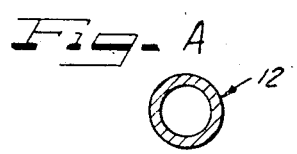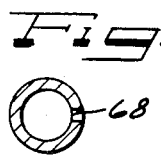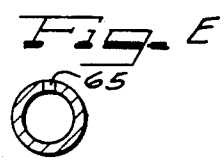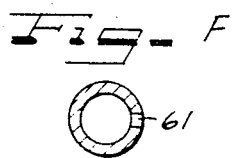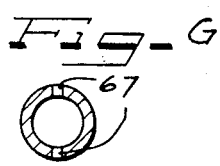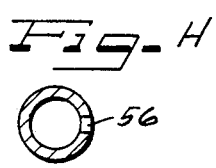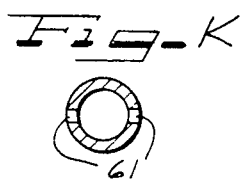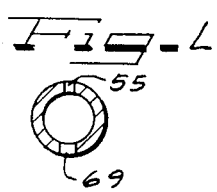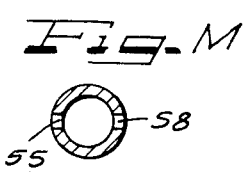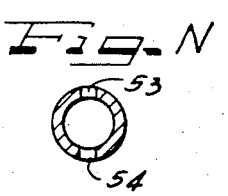

3,738,380

PRESSURE CONTROL VALVE

RELATED APPLICATIONS

This application is a division of our parent application Ser. No. 878,665 filed Nov. 21, 1969, now U.S. Pat. No. 3,597,010.

BACKGROUND OF THE INVENTION

1. Field of the Invention

This invention relates to an improved pressure-compensating valve configuration.

2. Description of the Prior Art

In a prior pending application of Gilbert H. Drutchas, Ser. No. 829,551 filed June 2, 1969 there is disclosed an hydraulic skid control brake system wherein prior to a brake application there exists two basic flow modes, one through a throttle valve and the other through a pressure-compensating valve. The pressure-compensating valve of the present invention constitutes an improvement over the pressure-compensating valve shown in that disclosure.

SUMMARY OF THE INVENTION

The pressure-compensating valve of the present invention utilizes a center flow pintle concept. A housing having a cylindrical valve bore closed at one end and a counterbored spring recess axially adjacent thereto vented to drain, an enlarged core around the cylindrical valve bore is referred to as the scanning annulus. A pintle valve in the valve bore has a closed end wall adjacent the closed end of the bore and a hollow interior as well as an open end projecting into the spring recess. Continuous biasing means connected to the open end of the pintle valve load the same in one direction. First and second passage means formed in the housing leading to and from the annulus from a source of pressure, for example, as generated by a wheel-driven pump and to a point of utilization, for example, a vehicle braking means, and from the first passage means to the closed end of the valve bore allow a plurality of orifices in the walls of the pintle valve to be successively scanned in the scanning annulus, thereby permitting partial or full diameter area sections to be freely sensed in a balanced state.

The orifices in the walls of the pintle valve are arranged and disposed in a longitudinal row and have successively decreasing areas from one end of the row to the other. Any tendency for the pressure-compensating valve to bind or otherwise develop hydraulic imbalance is thus relieved.

BRIEF DESCRIPTION OF THE DRAWINGS

FIG. 5 is an enlarged cross-sectional view of the center flow valve pintle.

Figure 1:
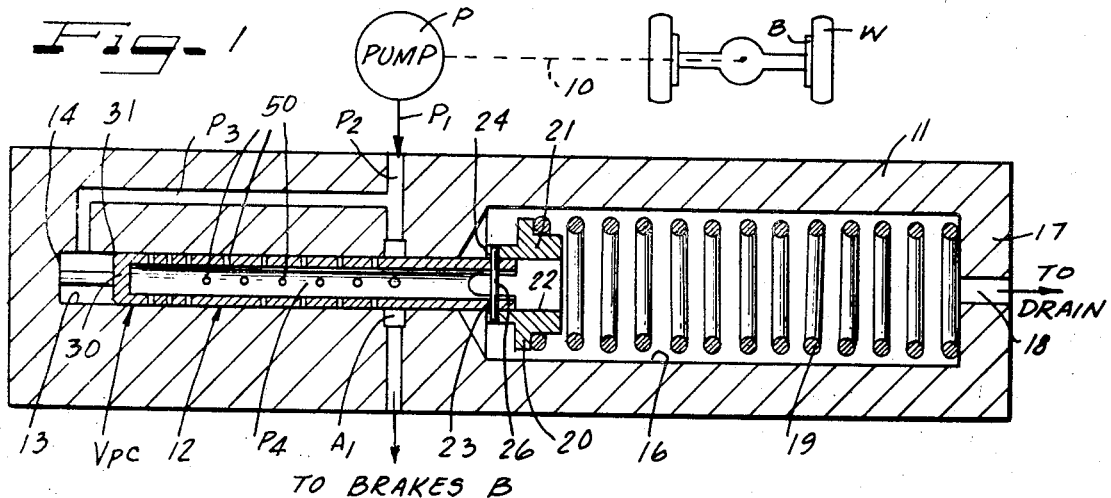
FIG. 1 is a cross-sectional view of a pressure-compensating valve provided in accordance with the principles of the present invention and is shown in combination with a schematic plumbing diagram to illustrate the location of the pressure-compensating valve in an hydraulic skid control braking system.

FIG. A is a cross-sectional view taken on line A—A of FIG. 5.

FIGS. D, E, F, G, H, J, K, L, M, and N are all corresponding cross-sectional views taken on lines D—D and correspondingly designated sectional lines on FIG. 5.

FIG. P is a cross-sectional view taken on line P—P of FIG. 5.

DESCRIPTION OF THE PREFERRED EMBODIMENT

Although the principles of the pressure-compensating valve disclosed herein are of general applicability, a particularly useful application is made in a hydraulic skid control brake system herein shown schematically to establish an environment of particular utility. Thus, there is shown the wheels of a vehicle indicated at W and having a brake mechanism indicated at B. A pump is shown at P and has a driven connection with the wheels shown at 10. The pump discharges through a line $P_1$ into a housing 11 in which is formed a passage $P_2$ communicating with a scanning annulus $A_1$ which circumscribes a center flow pintle valve shown generally at 12 and movable slidably and axially within a bore 13 constituting a cylindrical valve bore formed in the housing 11 and closed at one end by an end wall 14.

The housing 11 has an enlarged counterbored spring recess 16. The spring recess 16 is axially adjacent the bore 13 and has an end wall 17 in which is formed an opening 18 leading to drain. A coil spring 19 is bottomed against the end wall 17 at one end had has its other end bottomed against one surface of a flange 20 forming an abutment surface for a retainer member 21 which is piloted into the ends of the coiled spring convolutions of the coil spring 19.

The retainer member 21 has a bore 22 into which is slidably pressed the center flow pintle valve 12. The end of the pintle valve 12 is apertured as at 23 and the retainer member 21 is correspondingly apertured as at 24, thereby to receive a roll pin 26 provided to lock the pintle valve 12 and the retainer 21 together.

Referring to FIG. 5, it will be noted that the pintle valve 12 comprises a generally cylindrical part which can be conveniently machined from a cylindrical bar stock piece. Thus, the pintle valve 12 has an elongate cylindrical configuration including a closed end wall 30 having a chamfered corner 31. An outer peripheral surface 32 formed on the valve 12 has a row of grooves which are generally equally spaced and which are shown as at 33. The pintle valve 12 is made hollow by virtue of an internal bore 34. The open end of the valve 12 has an inwardly projecting recess 36 to facilitate assembly with the retainer 21.

The pintle valve 12 is particularly characterized by a plurality of orifices which are adapted to enter the scanning annulus $A_1$, and for convenience in identification are shown generally at 50 on FIG. 5 but which are identified more specifically on the lettered sectional views FIGS. D, E, F, G, H, J, K, L, M and N. Generally, it may be noted that the orifices arranged to enter the scanning annulus $A_1$ are of decreasing diameter. In a typical application of the principles of the present invention, the valve pintle 12 is approximately 2 inches long and the various openings 50 are made of different drill sizes as shown in the lettered sectioned views. Thus, for example, in FIG. D, the opening is made by a No. 68 drill (0.031 inches in diameter). In FIG. E the opening is made by a No. 65 drill (0.035 inches in diameter), while in FIG. F the opening is shown as made by a No. 61 drill (0.039 inches in diameter). To select the size of the area exposed to the scanning annulus, it will be noted that in FIG. K openings on diametrically opposite sides of the pintle valve are both made by a No. 61 drill (0.039 inches), while in FIG. L, the opening on one side is made by a No. 55 drill (0.052 inches) and on the opposite side by a No. 69 drill (0.0292 inches). Likewise, in FIG. M, an opening on one side is made by a No. 55 drill (0.052 inches), while on the opposite side the opening is made by a No. 58 drill (0.042 inches). In FIG. N, the opening is shown made by a No. 53 drill (0.0595 inches), while the opening indicated at 54 is made with a No. 54 drill (0.055 inches).

Flow issuing from the pump P enters the passage $P_2$ and thence flows to the scanning annulus $A_1$ where it circumscribes the pintle 12.

A passage $P_3$ is formed in the housing 11 and leads to the bore 13 behind the end wall 31 of the pintle valve 12. The flow passes through the first orifice 50 (viz., 53, 54 of FIG. N), thereby creating a pressure drop and then passes through the interior of the pintle valve 12 via the bore 34 and thence through the spring recess 16 and to drain via the opening 18 in the end wall 17.

Prior to a brake application, there exists two basic flow modes, one through the throttle valve of the braking system and the other through the pressure-compensating valve. Application of a braking effort to the master cylinder forces the throttle valve to close, thereby shunting all of the hydraulic flow through the pressure-compensating valve. Such diversion causes a sudden pressure surge because the pump flow increases in the passage $P_1$ and $P_2$ as well as in the scanning annulus $A_1$ and in the spring recess 16 and through the orifice 50 first presented to the scanning annulus, namely, the orifice shown in FIG. N (53 and 54). The rising pressure registering on the end wall 31 of the pintle valve 12 forces the pintle valve 12 to the right as the area on the right hand side of the pintle valve is under the influence of atmospheric pressure alone.

Movement of the pintle valve 12 continues to close the successive orifices and such orifices are of decreasing area. The increasing pressure drop creates a force acting on the end wall 31 which is greater than the spring force reaction of the coil spring 19. Thus, the slowing down of the vehicle wheel W causes the flow to drop from the wheel-driven pump P which can be flowing through any one of the orifices individually as shown in FIG. N and down successively through FIG. D, (depending on which opening 50 is in the scanning annulus $A_1$ ). Consequently, such action results in a drop of pressure in the passage $P_2$ and less force on the wall 31 of the pintle valve 12 and a subsequent reversal in the direction of the pintle valve 12 by the action of the coil spring 19.

Figure 2:
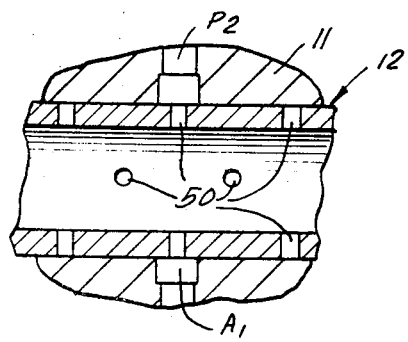
FIGS. 2 and 3 are enlarged fragmentary cross-sectional views illustrating how the scanning annulus permits partial or full diameter area sections to freely be sensed in a balanced state of the center flow pintle pressure-compensating valve.
Figure 3:
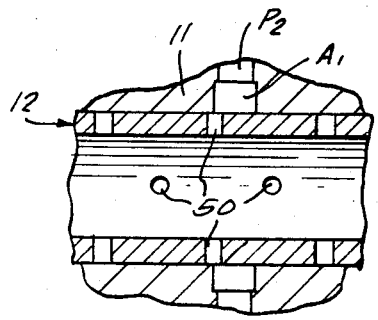

Thus, the system tries to adjust to a larger sized hole and a lesser system pressure. A sudden lowering of pump speed, (the signal of a low coefficient), will drop the pressure down and the valve pintle 12 will position any one of the larger diameter holes, i.e., the lower pressure holes, into the scanning annulus $A_1$. It is also possible to have the system select a partial hole setting in the scanning annulus. In FIG. 2, a set of holes 50 are shown in full diameter section. In FIG. 3 a set of holes 50 are shown related to the annulus $A_1$ and a partial hole setting.

The passage $P_3$ is used to give a dashpotting effect to reduce the underdamped effect of the pressure-compensating valve during hydraulic transients.

Figure 4:
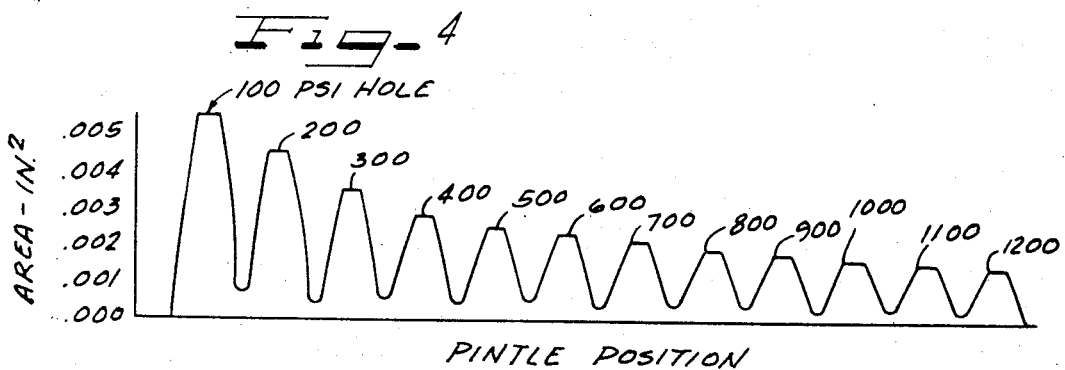
FIG. 4 is a graph plotting area against the pressure so that the figure represents the changing diameter's area interface with the scanning annulus.

The graph of FIG. 4 shows a typical plot of area versus pressure. Thus, the graph of FIG. 4 represents the effect of the changing diameter's area interface with the scanning annulus.

We claim as our invention:

1. In a pressure-compensating valve, the improvement of passage means forming an inlet from a source at increased pressure, an outlet to a point of utilization and an intermediate scanning annulus,
   a hollow pintle valve movable axially through said scanning annulus and having the hollow interior portion thereof vented to drain,
   a plurality of orifices disposed in horizontal rows in said pintle valve and having successively decreasing areas,
   and means to axially adjust said pintle valve in said annulus, thereby to control the compensatory action of the valve.

2. A pressure-compensating valve as defined in claim 1, and further characterized by
   a spring loading said pintle valve in one direction,
   and a motive surface on said pintle valve subject to inlet pressure for pressure-loading said pintle valve in an opposite direction against the bias of said spring,
   whereby the pintle valve will automatically adjust to the largest orifice size and lowest system pressure possible.

3. A pressure-compensating valve as defined in claim 1 wherein said last named means comprises a passageway interconnecting said source with an end wall of said pintle valve, whereby said pintle valve is forced in an axial direction, and means for resiliently biasing said pintle valve toward the opposite axial direction.

4. A pressure-compensating valve as defined in claim 3 wherein said valve has a housing surrounding said pintle valve, and wherein said biasing means comprises a spring disposed within said housing and urging said pintle valve axially relative to said housing.

5. In a pressure-compensating valve, the improvement of passage means forming an inlet from a source at increased pressure, an outlet to a point of utilization and an intermediate scanning annulus,
   a hollow pintle valve movable axially through said scanning annulus and having the hollow interior portion thereof vented to drain,
   a plurality of orifices disposed in said pintle valve and having successively decreasing areas,
   and means to axially adjust said pintle valve in said annulus, thereby to control the compensatory action of the valve.

6. A pressure-compensating valve as defined in claim 5 wherein said orifices are disposed in a longitudinal row in spaced relationship.

* * * * *